United States Patent [19]

Kruger

[11] Patent Number: 4,744,183

[45] Date of Patent: May 17, 1988

[54] LID OPENER

[75] Inventor: Joseph A. Kruger, Warsaw, Ind.

[73] Assignee: CTB, Inc., Milford, Ind.

[21] Appl. No.: 5,482

[22] Filed: Jan. 20, 1987

[51] Int. Cl.[4] .................... E05F 11/00; B65D 43/26
[52] U.S. Cl. .................................... 52/192; 49/357;
220/262; 220/264
[58] Field of Search .................. 52/192, 196, 197;
49/357, 345, 346, 356, 279, 347; 220/262–264, 334

[56] References Cited

U.S. PATENT DOCUMENTS

| 1,047,755 | 12/1912 | Craig | 52/196 |
| 1,615,878 | 2/1927 | Laird . | |
| 3,733,764 | 5/1973 | Hege | 52/192 |
| 3,961,660 | 6/1976 | Vinci | 49/356 X |
| 4,208,839 | 6/1980 | Candy, Sr. | 49/344 |
| 4,267,936 | 5/1981 | Pavlicek | 220/262 |
| 4,327,522 | 5/1982 | Meadows | 49/279 |
| 4,598,496 | 7/1986 | Van Daele | 49/357 |
| 4,625,888 | 12/1986 | Thompson | 220/262 |

FOREIGN PATENT DOCUMENTS

| 1083771 | 8/1980 | Canada | 49/357 |
| 516637 | 1/1931 | Fed. Rep. of Germany | 49/279 |
| 477230 | 10/1975 | U.S.S.R. | 49/357 |

Primary Examiner—Alfred C. Perham
Assistant Examiner—Richard E. Chilcot, Jr.
Attorney, Agent, or Firm—Trexler, Bushnell, Giangiorgi & Blackstone, Ltd.

[57] ABSTRACT

A lid opener apparatus is provided for use with a relatively large storage bin, and comprises a handle and structure for mounting and supporting the handle at a convenient height for manipulation by an operator. The mounting and support structure includes a first elongate link which has one end thereof pivotally mounted to the handle and the other end thereof pivotally mounted at a fixed location relative to the bin. A first elongate rod-like member is pivotally mounted to the same end of the link which receives the handle and extends upwardly to an area adjacent the top of the bin. A second rod-like member is pivotally coupled at one end thereof to the lid and extends outwardly to an area adjacent the uppermost end of the first rod-like member. A bell crank has three mounting portions arranged in a generally triangular configuration, and these three mounting portions are respectively pivotally coupled to the adjacent ends of the two elongate rod-like members and to the bin, preferably at an area where a sidewall and top wall thereof meet.

10 Claims, 2 Drawing Sheets

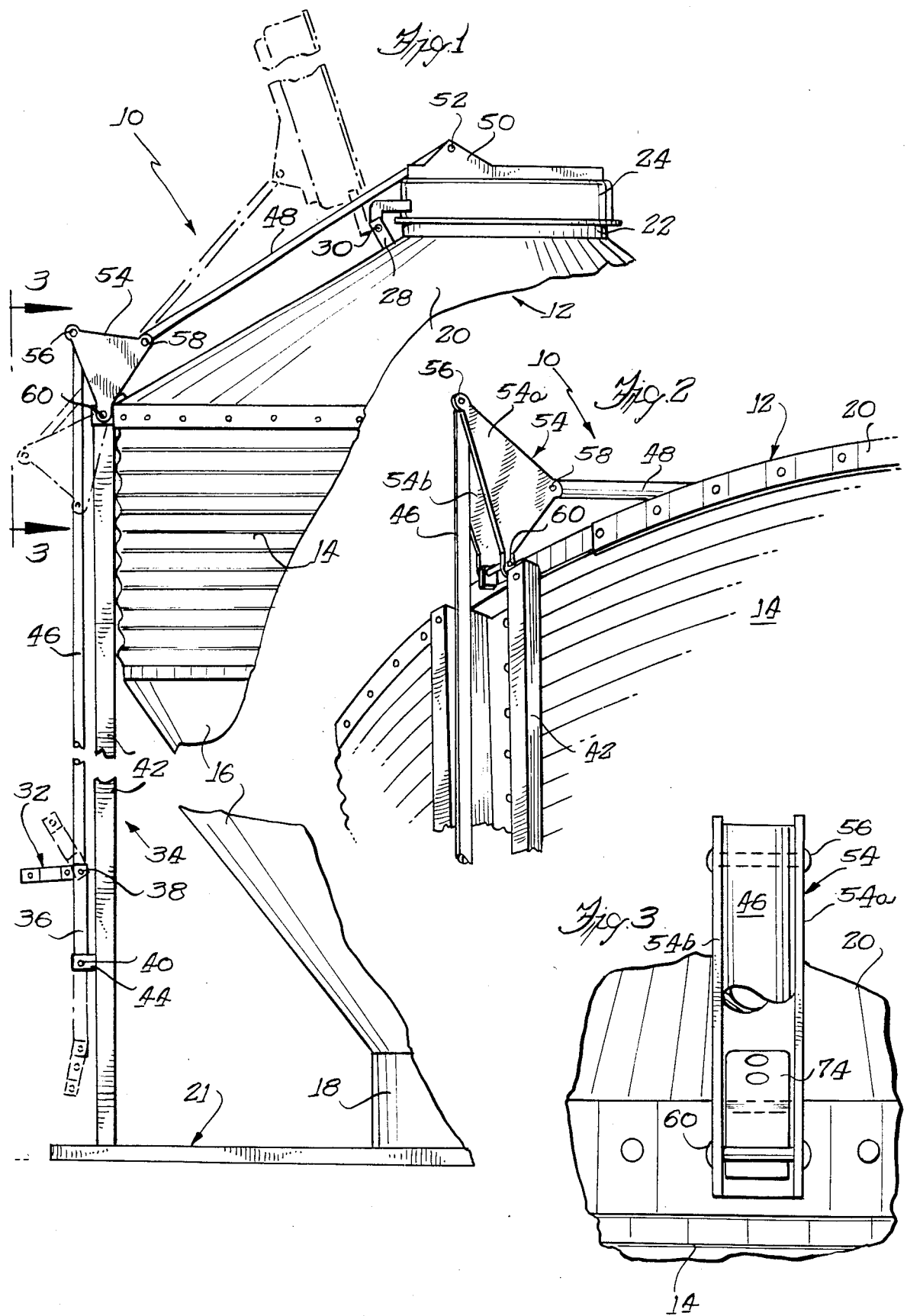

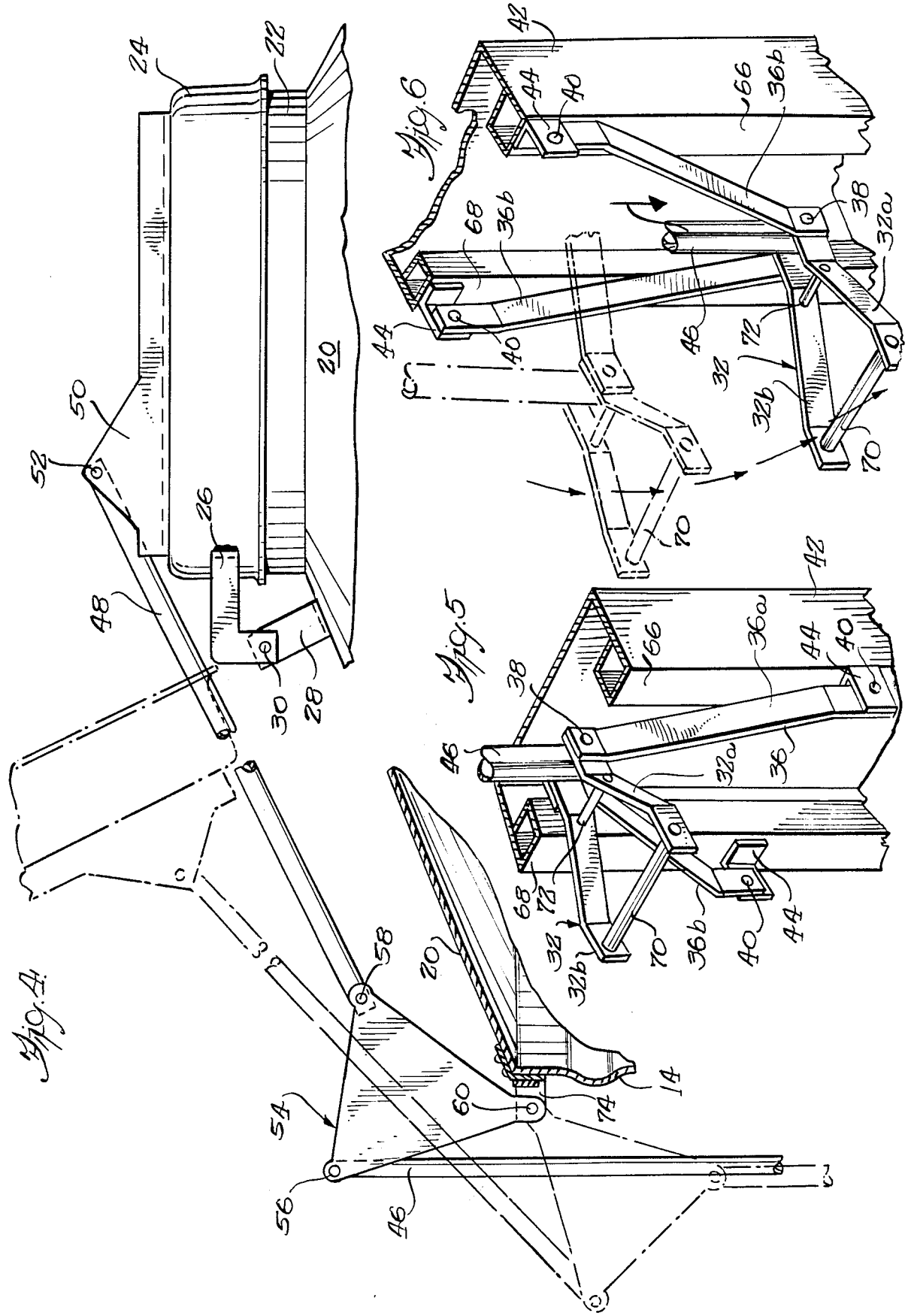

LID OPENER

BACKGROUND OF THE INVENTION

This invention is directed generally to the bulk storage bin arts, and more particularly to a novel and improved lid opener apparatus for use in opening and closing the lid of a relatively large bulk storage bin by an operator standing on the ground, or the floor or at some other convenient surface adjacent the bin.

Grain bins and other bulk storage bins are widely used in modern agricultural and industrial settings. Such bins are used, for example, to store grains, foods, food products and other bulk materials for agricultural or industrial use. Such bins may be used for example to store grains or feed for livestock in livestock raising or animal husbandry operations.

Many of these bins are provided with fill or inlet openings at or near the top or uppermost portions thereof, and with corresponding outlet openings or other material removal mechanisms generally at a bottom or lowermost portion thereof. Typically, such bins are relatively tall, wide structures supported on frames, and including generally cylindrical sidewalls which fit atop funnel-like lower portions for funneling or directing the material to the outlets. Similar, although usually somewhat shallower, inverted funnel-like top portions are often provided, culminating in the inlet or fill opening. Suitable closure lids are generally used to cap these fill openings. In the case of bins intended for out-of-doors use, these lids often are arranged to provide a weatherproof fit.

Heretofore, the lids for typical feed storage bins were generally pivotally or hingedly mounted relative to the fill opening so that the lid could be swung to an open position by an operator, either directly, or by means of a chain and pulley system or the like, operated from the ground level. The chain may then be latched or locked in some suitable fashion to support the lid in its open position so that the bin may be filled. In order to close the lid, the chain is released and the lid may lower itself by gravity or by spring-operated closure means in some instances.

However, in many bins, it is difficult or impossible for an operator standing on the ground to observe the lid during operation. This is due to the great height and width of typical storage bins. Accordingly, the operator cannot be sure either that the lid has fully and securely closed over the bin opening, or that the lid has fully opened to insure interference-free filling through the fill opening. Moreover, the operator cannot be sure that the lid will not be inadvertently blown partially open by wind during inclement weather.

Accordingly, it is a general object of the invention to provide a bin lid opening and closing apparatus and system which permits an operator, standing at some location remote from the bin lid, and not necessarily within sight thereof, to reliably raise the lid and open the bin inlet, and to positively lower the lid and close the bin inlet.

A related object is to provide such a lid opening and closing apparatus which assures that the lid remains in the desired open or closed position, once achieved, by providing some positive locking or latching action relative to the lid and the opening and closing apparatus.

A related object is to provide such a bin opening and closing system and apparatus which is reliable in operation, and is rugged in use so as to provide a long, relatively maintenance-free service life.

A further related object is to provide a bin lid opening and closing system and apparatus in accordance with the foregoing objects which is relatively simple and inexpensive in its manufacture and cost of construction, and may be relatively simply and inexpensively retrofitted to existing storage bins.

Briefly, and in accordance with the foregoing objects, a lid opener apparatus is provided for use with a relatively large storage bin of substantial height and width, having a peripheral sidewall portion, a top wall portion, an opening in an upper surface of said top wall portion substantially inwardly spaced from the sidewall portion, and a hingedly mounted lid for selectively covering and exposing said opening. The lid opener apparatus comprises handle means for gripping by an operator to operate the apparatus; and means mounting and supporting said handle means relative to said bin at a given height convenient for manipulation thereof by an operator.

The mounting and supporting means include an elongate link means pivotally mounted to said handle means at one end thereof and pivotally supported at said given height relative to said sidewall at an opposite end thereof. A first elongate rod-like member is pivotally mounted to the first end of the link means and extends upwardly therefrom to an area adjacent the top wall portion. A second elongate rod-like member is pivotally coupled at a first end thereof to the lid and extends outwardly of the lid to the same side thereof which is hingedly mounted to the top wall of the bin. This second, rod-like member extends outwardly to an area adjacent the uppermost end of the first rod-like member, where the two are pivotally joined to a bell crank. The bell crank has three mounting portions thereon arranged in a generally triangular configuration, and respectively pivotally coupled to the adjacent ends of the two rod-like members and to the bin at an area where the sidewall portion and top wall portion meet.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals indentify like elements, and in which:

FIG. 1 is a partially broken away, partial side elevation of a storage bin provided with a lid opening and closing apparatus in accordance with the invention;

FIG. 2 is an enlarged partial perspective view illustrating a bell crank portion of the apparatus of the invention;

FIG. 3 is a further enlarged partial elevation taken generally in the plane of the line 3—3 of FIG. 1;

FIG. 4 is a further enlarged partial side elevation, similar to FIG. 1, and illustrates an upper portion of the lid opening and closing apparatus of the invention; and FIGS. 5 and 6 are partial perspective views illustrating a lower portion of the apparatus of the invention, FIG. 5 illustrating the lid closed position thereof and FIG. 6 illustrating the lid open position and an intermediate position in phantom line.

DETAILED DESCRIPTION OF THE ILLUSTRATED EMBODIMENT

Referring now to the drawings, and initially to FIGS. 1-4, a novel and improved lid opener apparatus in accordance with the invention is designated generally by the reference numeral 10. Advantageously, the lid opener apparatus 10 of the invention is particularly useful with a relatively large storage bin, generally designated by reference numeral 12, which is of substantial height and width. This large storage bin 12 often rests upon the ground or other floor surface, and/or may be supported by a suitable frame structure, one upright 42 of which is shown.

This relatively large storage bin has a peripheral sidewall or body portion 14 which is a tubular, open-ended and preferably generally cylindrical wall of substantial diameter. At a lower edge of this generally cylindrical sidewall or intermediate body portion is a lower, funnel-like body portion 16 for guiding feed downwardly to a lower outlet portion 18. Similarly, extending from and coupled with an upper edge of sidewall 14 is a top wall or upper body portion 20, also preferably of a funnel-like configuration and culminating in a generally circular, and preferably centrally disposed access opening 22. In order to alternatively cover and permit access for filling the container through access opening 22, a hingedly mounted lid 24 is provided. In the illustrated embodiment, lid 24 is hingedly mounted by suitable brackets 26, 28 which are hingedly connected as indicated at 30, for permitting hinged opening and closing movement of the lid relative to opening 22. Hence both opening 22 and lid 24 are located in an upper surface of the top wall or body portion 20 and are substantially inwardly spaced from the exterior periphery of sidewall or body portion 14.

Accordingly, it will be appreciated that an operator standing on the ground or floor surface 21 will find it difficult or impossible to maintain an unobstructed view of the top opening 22 and particularly of lid 24 during opening and closing of the lid. However, it is important that an operator correctly ascertain and verify that the lid 24 is, in fact, maintained in a fully open position (indicated in phantom line in FIG. 1) during filling of the bin to avoid interference with the filling procedure and possible damage to the lid, hinge and related elements. In the same fashion, it is important to assure that the lid is fully and firmly closed at other times relative to opening 22, to assure that a substantially weathertight seal is maintained, and to protect the contents of the bin 12.

Accordingly, the present invention provides the novel and improved lid opener apparatus 10 for respectively opening and closing lid 24 and for further positively maintaining the lid latched or locked in a releasable fashion in both the fully open and fully closed positions. The invention is thus advantageously arranged such that the operator need not visually ascertain or confirm operation of the lid, but can rely upon the status of the handle portion of the lid opener apparatus of the invention, as will be more fully explained hereinbelow, for indicating the open or closed position of the lid.

In accordance with the illustrated embodiment, the lid opener apparatus includes a handle or handle means 32 for gripping by the operator to operate the apparatus. Mounting and supporting means or structure generally designated by reference numeral 34 is provided for mounting this handle 32 at a given height relative to the bin 12, convenient for manipulation of the handle by an operator standing on the ground or floor surface 21. In the illustrated embodiment this mounting and support means includes an elongate link member or link means 36 which is mounted pivotally to the handle 32 at one end thereof, and is also pivotally supported or mounted at a convenient height relative to the bin for handle manipulation at an opposite end thereof. These two pivot points or structures are indicated at reference numerals 38 and 40. In the illustrated embodiment the upright 42 comprises an elongate, generally U-shaped channel member mounted to the bin 14 and extending from the topmost portion of wall 14 substantially directly vertically downwardly to the floor or ground surface 21. Outwardly extending brackets or bracket means 44 are provided at a lower portion of the elongate channel 42 for pivotally mounting the one end of the link 36 thereto at pivot 40 as previously indicated.

The lid opener apparatus further includes a first elongate rod-like member which is also pivotally mounted to the link 36, and preferably at the same pivot point or structure 38 as handle 32, and extends upwardly therefrom to an area adjacent top wall portion 20 of the bin. A second, similar elongate rod-like member 48 is pivotally coupled at one end thereof to the lid 24 by a bracket 50. Preferably, bracket 50 is located to one side of center of the lid, such that a pivot point 52 is located generally to the same side of center of lid 24 as hinge or pivot point 30. The second rod-like member 48 thus extends outwardly from the lid in generally the direction of the side to which this hinge or pivot point 30 of the lid is located.

In accordance with the invention, the generally vertical motion of rod-like member 46 is converted into a generally horizontal motion of rod 48 for opening and closing the lid 24 by a bell crank member or means 54. In the illustrated embodiment, the bell crank means or member is generally triangular in configuration, having three pivot areas or mounting portions 56, 58 and 60 which are respectively coupled to adjacent ends of the two rod-like members 46, 48 and to the bin, preferably at a part of the bin adjacent the area at which the sidewall portion 14 and top portion 20 meet. It will be understood in this regard that the two rod-like members 46 and 48 will be inclined at various angles relative to the vertical and horizontal planes during their respective travel in opening and closing the lid 24. However, the terms "generally vertical" and "generally horizontal" have been utilized above, since the motion of the rod-like member 46 is primarily vertical in nature, whereas the motion of the rod-like member 48 is primarily horizontal in nature (although at somewhat of an angle, in view of the funnel-like shape and hence angular orientation of top wall member or portion 20).

In view of the foregoing structure, and as shown in FIG. 1, it will be seen that the link 36 is movable over substantially 180 degrees of arc from a first, lid closing position wherein the link is generally upright with respect to the bin, to a second, lid opening position wherein the link is generally downwardly extending relative to the bin. More particularly, and as best viewed in FIGS. 5 and 6, to which reference is now invited, the structure of the channel and brackets previously described, and mounting of the handle to the link permit an "over-center" movement of the link in either direction. That is, the pivot point 40 defined by the channel 42 and bracket 44 is projected outwardly relative to both the bin wall and the channel sufficiently to permit some additional pivotal movement of the link somewhat over center or in excess of this 180 degree arc in both directions. This additional over-center type movement further defines locking positions, for selectively holding the link substantially locked in the over-center condition to either side for positively maintaining the lid in the corresponding open or closed position. Hence, the channel and brackets 44 and the pivotal mounting of handle relative to the link are arranged advantageously in two respects. Firstly, this arrangement pivotally mounts the link so as to define the location of the handle convenient for access to an operator standing on the ground or other surface 21. Secondly, this arrangement defines the over-center locking positions and the throw of the handle and link between the two locking positions, this "throw" consisting of somewhat greater than 180 degrees of arc, as just described.

As previously mentioned, the handle means and first rod-like member first end are preferably pivotally mounted about a common axis, and in the illustrated embodiment are coupled by a common pivot member or pin 38 relative to the link 36. As best viewed in FIGS. 5 and 6, the U-shaped channel 42 opens outwardly relative to bin sidewall 14 to define a pair of spaced apart abutment surfaces 46 and 48, which in turn define the limits of movement of both the link 36 and handle 32.

Cooperatively, the link means comprises a pair of similar link members 36a and 36b, each mounted to one of brackets 44 which extends from and is mounted to one of the abutment surfaces 66, 68 of the channel 42. Hence, the limit of inward movement of the link members 36a and 36b is, in effect, defined by these surfaces 66 and 68. These two similar link members 36a and 36b are formed to generally converge inwardly or toward each other to meet to either side of or embrace the end of the rod-like member 46 at the pivot or pivot pin 38. Similarly, the handle 32 also comprises a pair of similar, opposing handle members or arms 32a, 32b which converge upon the rod 46 at the pivot pin 38. In the illustrated embodiment, the ends of link members 36a and 36b are coupled outwardly of the ends of handle members 32a and 32b with respect to rod 46; however, the opposite arrangement may be utilized without departing from the invention.

The handle members or arms converge to receive an elongate, transversely mounted handle grip member 70 therebetween. Preferably, the effective width of the handle at the grip 70 is at least as great as the spacing between the surfaces 66, 68 of the channel 42 so as to prevent movement of the hand grip portion of the handle inwardly of the channel 42.

The handle 32 further includes a crossbar member 72 extending transversely of the handle members or arms 32a, 32b. This crossbar member 72 is spaced from the pivot 38 by a distance somewhat greater than the radius of the rod-like member 46. Accordingly, as the handle is moved vertically upwardly past the position illustrated in FIG. 5, to an over-center or locking position, this crossbar member 72 abuts the rod 46 to prevent pinching of the hand of an operator between crossbar 70 and rod 46. This latter, fully up position of the handle is also indicated in phantom line in FIG. 1.

Relative positions of the link member or assembly 36 and hand grip 32 between the fully vertically up and locked over-center position and the fully vertically down and locked over-center position are shown respectively in FIGS. 5 and 6. A further intermediate position is partially shown in phantom line in FIG. 6.

As best viewed in FIGS. 3 and 4, the bell crank member 54 is preferably mounted to a corner portion of the bin where the top member 20 meets and overlies an upper portion of sidewall 14 by a suitable bracket 74. More particularly, this bracket 74 pivotally mounts a pair of parallel and spaced apart generally triangular plates 54a and 54b which define the bell crank 54. These plates also define the mounting portions 56, 58 and 60 thereof, which therefore embrace the respective rod-like members 46 and 48 and brackets 74 and are pivotally coupled therewith by suitable pivot pins. It should be noted that the fully opened position of the lid 24, and the corresponding positions of the rods 46, 48 and bell crank 54 are indicated in phantom line in FIGS. 1 and 4, respectively.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A lid opener apparatus for use with a relatively large storage bin of substantial height and width, and having a peripheral sidewall portion, a top wall portion, an opening in an upper surface of said top wall portion substantially inwardly spaced from the sidewall portion, and a lid hingedly mounted to the top wall for selectively covering and exposing said opening; said lid opener apparatus comprising: handle means for gripping by an operator to operate the apparatus; means mounting and supporting said handle means relative to said bin at a given height convenient for manipulation thereof by an operator; said mounting means including elongate link means pivotally mounted at a first end thereof to said handle means and pivotally supported at said given heights relative to said bin at a second, opposite end thereof, a first elongate substantially rigid rod-like member also pivotally mounted to said first end of said link means and extending upwardly therefrom to an area adjacent said top wall portion; a second elongate substantially rigid rod-like member pivotally coupled at one end thereof to said lid and extending outwardly of said lid generally in a direction of a side thereof which is hingedly mounted to said top wall and to an area adjacent an uppermost end of said first rod-like member; bell crank means having three mounting portions thereon arranged in a generally triangular configuration, said three mounting portions being respectively pivotally coupled to the respective adjacent ends of said first and second elongate rod-like members and to said bin at a part hereof adjacent the area thereof at which said sidewall portion and said top wall portion meet, to thereby translate generally vertical motion of said first rod-like member into a generally horizontal motion of said second rod-like member for opening and closing said lid about the hingedly mounted portion thereof.

2. Apparatus according to claim 1 wherein said handle means and said first rod-like member first end pivot about a common axis relative to said link means.

3. Apparatus according to claim 1 wherein said link means is pivotally movable over substantially 180 degrees of arc from a first, lid-closing position wherein the link is generally vertically upright with respect to the bin, to a second, lid-opening position wherein the link is generally vertically downwardly extending relative to the bin.

4. Apparatus according to claim 2 wherein said handle is pivotally movable relative to said link for urging the same between said first and second positions thereof and wherein said mounting means further includes bracket means for pivotally mounting said link means second, opposite end with the pivot point thereof projected outwardly relative to the bin sidewall, for thereby permitting additional pivotal of said 180 degree arc and past both of said first and second positions to respective locking positions, for thereby selectively holding the link substantially locked in said over-center locking positions for positively maintaining the lid in either of said open or closed positions, and such that said handle can be manipulated to place said link into said locking positions without forming a scissors point in said lid opening apparatus and exposing the operators hand to injury caused thereby.

5. Apparatus according to claim 4 wherein said bin further comprises an elongate channel-like support member extending vertically over substantially the length of said bin sidewall and at least to said given convenient height, said bracket means being fixedly mounted to said channel-like member and extending outwardly thereof for pivotally mounting said link to thereby define both the location of said handle means and the throw thereof between said over-center locking positions of said link means, respectively, 6. Apparatus according to claim 5 wherein said channel-like member is generally U-shaped and opening outwardly relative to said bin sidewall and defines a pair of spaced apart abutment surfaces projecting from the sidewall, for defining the effective limits of movement of said link means and said handle means.

7. Apparatus according to claim 6 wherein said link means comprises a pair of pivotally mounted link members, each mounted to a bracket extending from one of said abutment surfaces of said channel and comprising said bracket means, and converging therefrom to generally embrace said end of said first rod-like member pivotally mounted thereto.

8. Apparatus according to claim 7 wherein said handle comprises a pair of arms also embracing said pivotally mounted end of said first rod-like member and converging therefrom to embrace a handle grip transversely mounted therebetween, the width of said handle grip being at least as great as the spacing between said U-shaped channel-like member outer abutment surfaces, to generally prevent movement of said hand grip inwardly of the U-shaped channel-like member.

9. Apparatus according to claim 7 and further including a crossbar extending transversely of said handle arms and spaced outwardly of the pivot point of the handle by a distance somewhat greater than the radius of said first rod-like member for abutting said rod-like member upon a predetermined amount of angular motion of the handle relative thereto to thereby define an upper limit of movement of the handle relative to the rod-like member for preventing pinching of the hand of an operator between the handle grip and rod-like member.

10. A lid opener apparatus for use with a relatively large storage bin having a peripheral sidewall portion, a top wall portion, an opening in an upper surface of said top wall portion, and a lid hingedly mounted to the top wall for selectively covering and exposing said opening; said lid opener apparatus comprising:

handle means for gripping by an operator to operate the apparatus; means mounting and supporting said handle means relative to said bin at a given height convenient for manipulation thereof by an operator; a first elongate rod-like member pivotally mounted at one end thereof to said handle means and extending upwardly therefrom to an area adjacent said top wall portion; a second elongate rod-like member pivotally coupled at one end thereof to said lid and extending outwardly of said lid to the same side thereof which is hingedly mounted to said top wall and to an area adjacent an uppermost end of said first rod-like member; bell crank means having three mounting portions thereon arranged in a generally triangular configuration, said three mounting portions being respectively pivotally coupled to the respective adjacent ends of said first and second elongate rod-like members and to said bin at a part thereof adjacent the area thereof at which said sidewall portion and said top wall portion meet, to thereby translate generally vertical motion of said first rod-like member into a generally horizontal motion of said second rod-like member for opening and closing said lid about the hingedly mounted portion thereof in response to movement of the first rod-like member one end by the handle means.

* * * * *